(12) United States Patent
Canova et al.

(10) Patent No.: US 8,918,805 B2
(45) Date of Patent: Dec. 23, 2014

(54) METHOD FOR SYNCHRONIZATION OF INTERACTIVE CONTEXTUAL CONTENT WITH BROADCASTING AUDIO AND/OR VIDEO

(75) Inventors: Weber George Canova, Barueri (BR);
David Estevam de Brito, Itaipu (BR);
Marcio Antonio Ramos Alves, Recreio (BR)

(73) Assignee: TQTVD Software Ltda., Rio de Janeiro (BR)

( * ) Notice: Subject to any disclaimer, the term of this patent is extended or adjusted under 35 U.S.C. 154(b) by 116 days.

(21) Appl. No.: 13/121,570

(22) PCT Filed: Sep. 30, 2009

(86) PCT No.: PCT/BR2009/000299
§ 371 (c)(1),
(2), (4) Date: Mar. 29, 2011

(87) PCT Pub. No.: WO2010/037189
PCT Pub. Date: Apr. 8, 2010

(65) Prior Publication Data
US 2011/0181775 A1    Jul. 28, 2011

(30) Foreign Application Priority Data
Sep. 30, 2008   (BR) .................................. 0806069

(51) Int. Cl.
*H04N 7/10* (2006.01)
*H04N 7/025* (2006.01)
*H04N 7/16* (2011.01)
*H04N 21/434* (2011.01)
*H04N 21/236* (2011.01)
*H04N 21/43* (2011.01)
*H04N 21/488* (2011.01)
*H04N 21/643* (2011.01)

(52) U.S. Cl.
CPC ..... *H04N 21/4348* (2013.01); *H04N 21/23614* (2013.01); *H04N 21/4307* (2013.01); *H04N 21/4884* (2013.01); *H04N 21/643* (2013.01)
USPC ................................................. 725/32; 725/136

(58) Field of Classification Search
USPC ................................................ 725/32–36, 136
See application file for complete search history.

(56) References Cited

U.S. PATENT DOCUMENTS

| | | | |
|---|---|---|---|
| 7,174,560 B1 * | 2/2007 | Crinon | 725/139 |
| 2004/0107449 A1 * | 6/2004 | Fukuda et al. | 725/136 |
| 2005/0138674 A1 * | 6/2005 | Howard et al. | 725/136 |
| 2006/0190983 A1 * | 8/2006 | Plourde, Jr. | 725/145 |
| 2007/0091919 A1 * | 4/2007 | Sandoval | 370/466 |
| 2008/0141327 A1 * | 6/2008 | Oh et al. | 725/131 |
| 2008/0244640 A1 * | 10/2008 | Belleguie | 725/35 |

* cited by examiner

*Primary Examiner* — Randy Flynn
(74) *Attorney, Agent, or Firm* — Laurence P. Colton; Smith Risley Tempel Santos LLC

(57) ABSTRACT

The present invention describes a method for synchronizing data of an interactive content with the audio and/or video of TV broadcasting. Especially, but without limitation, the method of the present invention is for synchronizing subtitles for digital TV applications.

7 Claims, 3 Drawing Sheets

METHOD FOR SYNCHRONIZATION OF INTERACTIVE CONTEXTUAL CONTENT WITH BROADCASTING AUDIO AND/OR VIDEO

BACKGROUND OF THE INVENTION

1. Field of the Invention

The present invention describes a method for synchronizing data of an interactive content with the audio and/or video of TV broadcasting. Especially, but without limitation, the method of the present invention is for synchronizing subtitles for digital TV applications.

2. Prior Art

In the current stage of digital television, data relating to interactive contents can be developed and broadcast jointly with TV programs.

Interactive content data associated to audio/video as well as the audio and video of the program transmission itself are multiplexed and sent by the "transport stream" by the broadcasters.

In view of this implementation, the correct exhibition of the interactive content with the audio/video of the transmission is required, to the extent that the synchronization of this content with the audio/video is of the utmost importance.

Patent literature describes few documents aimed at resolving the problem of synchronicity of these contents in a satisfactory manner.

Document US 2006/0050794 describes a method for displaying audio and video data where synchronization is implemented only at the start of the audio transmission, which allows desynchronization of the data that cannot be corrected once the transmission has begun. The present invention differs from this document by presenting a method for synchronizing an interactive content related to audio and/or video of the program transmitted and maintaining this synchronization for the entire duration of the transmission, even in the absence of the broadcaster's signal.

The search of the literature revealed no documents that anticipate or suggest the teachings of the present invention, so the solution now proposed bears novelty and inventive activity, in the eyes of inventors, in light of the state of the art.

BRIEF SUMMARY OF THE INVENTION

It is an object of the present invention a method for synchronizing data of an interactive content with the audio and/or video of TV broadcasting comprising the step of executing an application for digital TV in which synchronization will be implemented, wherein the application prepared to receive synchronization events is sent by the broadcaster via the DSM-CC (digital storage media command and control) protocol, for example, via object carousel and, when executed, will:

i) register as a DSM-CC events listener with event messages that define the values of a counter that comprises:
values corresponding to the synchronicity between the interactive content and the audio and/or video; and
time interval values that instruct when the application executed will check whether the interactive content is in synchronization with the audio and/or video;

ii) identify the sequence value corresponding to the synchronization and the time interval value sent by the messages transmitted via DSM-CC;

iii) initiate timer and own counter; and iv) synchronize the interactive content data of the application in execution with the audio and/or video of TV broadcasting in accordance with the value sent by the DSM-CC stream event at each pre-set time interval;

wherein the application in execution is capable of maintaining the ascending count of the sequence values and keeping check of synchronicity in the same time interval informed by the DSM-CC stream events even in the absence of the signal, by way of the timer and counter initiated in item ii).

Especially, the method described above is used in applications of the karaoke and/or videoke; movie and program subtitles; games etc.

These and other objects of the invention will be immediately appreciated by persons skilled in the art and will be described in sufficient detail (fully disclosed) such that they can be reproduced by the description ahead.

DETAILED DESCRIPTION OF PREFERRED EMBODIMENTS

Figure 1:
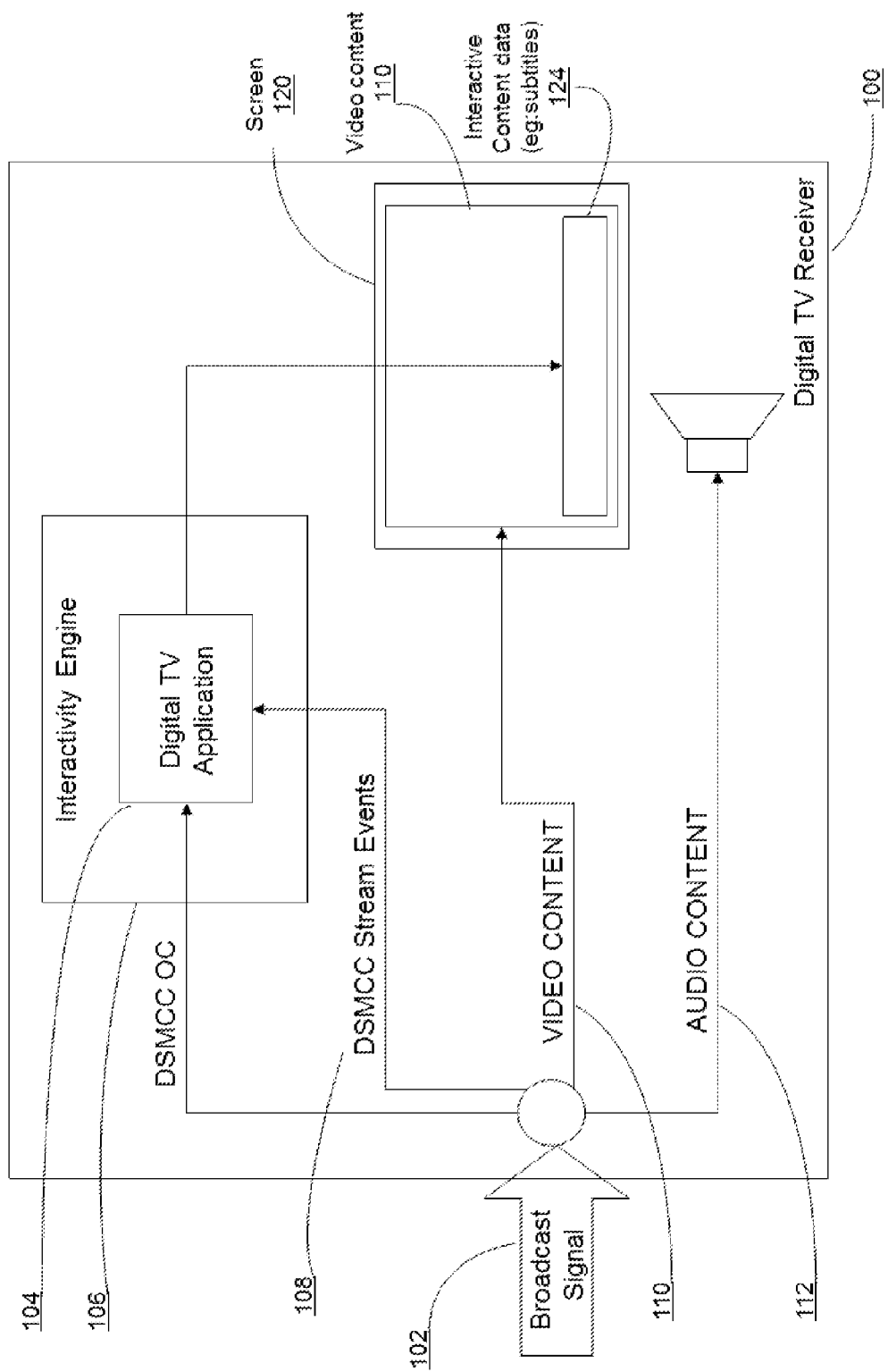
FIG. 1 is a schematic of the flow inside a digital TV receiver that is suitable for use with the present invention.
Figure 2:
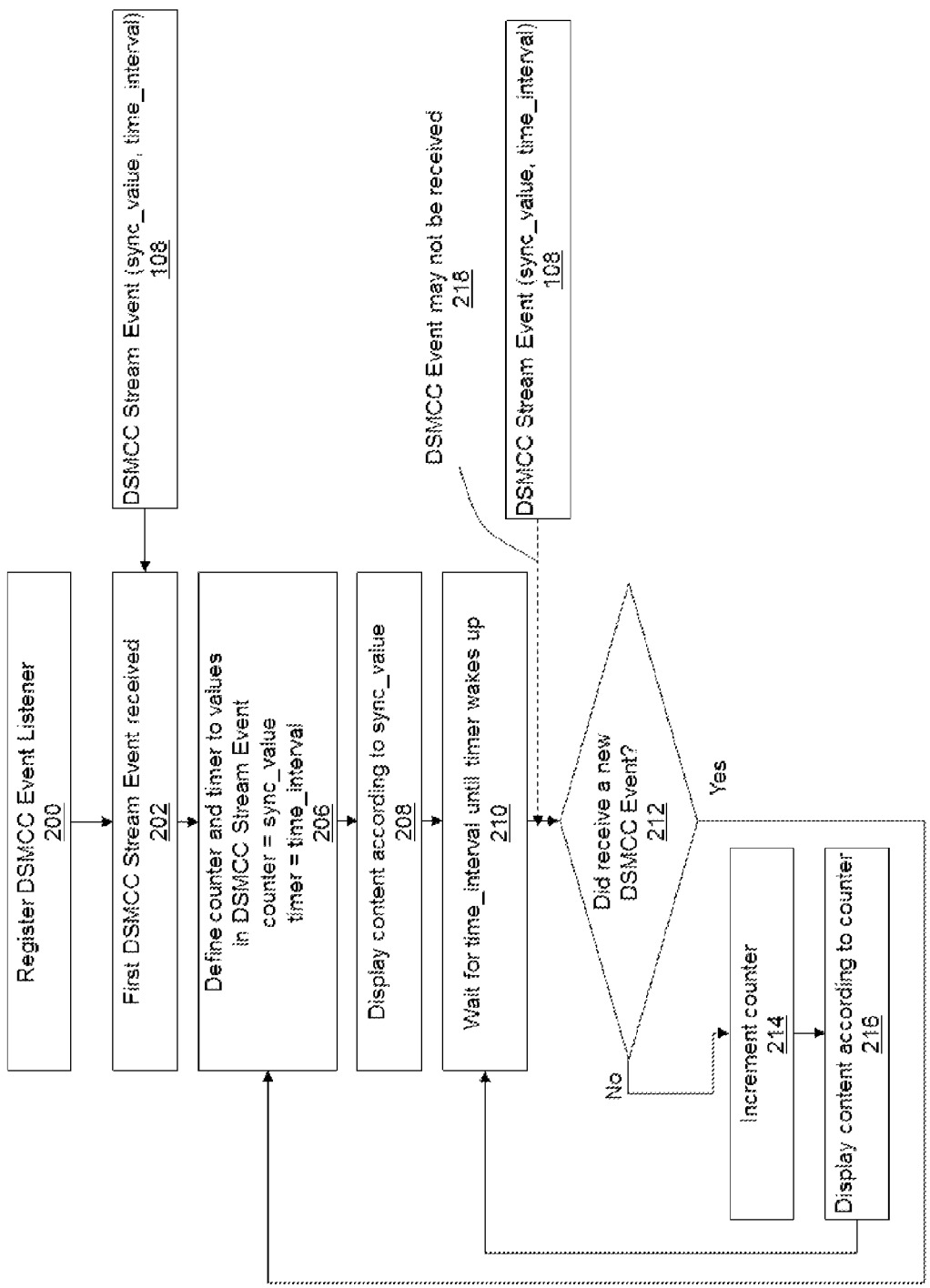
FIG. 2 is a digital TV application flow executed in a digital TV receiver according to the method of the present invention.

The examples shown here are only intended to exemplify one of the innumerous ways of carrying out the invention, yet without limiting the scope thereof.

Referring in part to the FIGs., the present invention provides a method for synchronizing data of an interactive content 124 with the audio 112 and/or video 110 of TV broadcasting comprising the step of executing an application for digital TV 104 in which synchronization will be implemented, wherein the application prepared to receive synchronization events is sent by the broadcaster via the DSM-CC protocol 108, for example, via object carousel and, when executed, will:

i) register as a DSM-CC events listener 200 with event messages 108 that define 206 the values of a counter that comprises:
values corresponding to the synchronicity between the interactive content and the audio and/or video; and
time interval values that instruct when the application executed will check whether the interactive content 124 is in synchronization with the audio 112 and/or video 110;

ii) identify the sequence value corresponding to the synchronization and the time interval value sent by the messages transmitted via DSM-CC 208;

iii) initiate timer and own counter 206; and iv) synchronize the interactive content data 124 of the application in execution with the audio 112 and/or video 110 of the TV broadcasting in accordance with the value sent by the DSM-CC stream event 208 at each pre-set time interval 302;

wherein the application in execution is capable of maintaining the ascending count of the sequence values 214 and keeping check of synchronicity 216 in the same time interval informed by the DSM-CC stream events even in the absence of the signal, by way of the timer 210 and counter initiated in item ii).

The application is executed by the digital TV reception apparatus being controlled by an applications execution system 106 present in the digital TV reception apparatus 100.

The DSM-CC stream events send the sequence values, transmitting one value only at a time, without repeating it, in ascending order 108. The duration of the transmission of the values is synchronized with the duration of the TV program 300. The transmission of the values can be throughout the entire TV program or just part of it. The values are sent at pre-defined intervals 302, and should be adjusted in accordance with the content of the transmission.

In a preferred embodiment, in DSM-CC stream events, messages are sent containing sequence values (counter) which are not repeated 108. Said messages can be written in different languages, provided they are compatible with the applications execution system 106 present in the TV reception apparatus 100. A non-limitative example of the type of message includes messages written in NCL Live Editing of the SetPropertyValue kind At the start of transmission 300, the DSM-CC stream event contains a signal that signals to the application in execution that the synchronization of the interactive content data 124 with the audio 112 and/or video 110 of the transmission should be implemented. This signal can be a signal at the start of the transmission or in a transmission that has already begun 108. When it receives this signal 202, the application in execution 104, based on the value sent 206, identifies which part of the interactive content data should be displayed 208 in synchronization with the audio 112 and/or video 110.

The application in execution also has its own counter and timer, which is designed to maintain the synchronicity even in the absence of the broadcaster's signal 216. This synchronicity is possible due to the fact that the counter, even in the absence of the broadcaster's signal, maintains the ascending count over time 214 and due to the fact that the timer counts the passing of time at each pre-set time interval by the DSM-CC stream event 210, synchronizing the interactive content data with the audio and/or video of the transmission 216, wherein the DSM-CC protocol is preferably an object carousel.

In a preferred embodiment, the time interval indicated by the DSM-CC stream 108 may vary according to the time, provided that the time unit measurement adopted for the stream event is the same as the application. The time interval may be any value of x, wherein x>0 and x≤n seconds.

Figure 3:
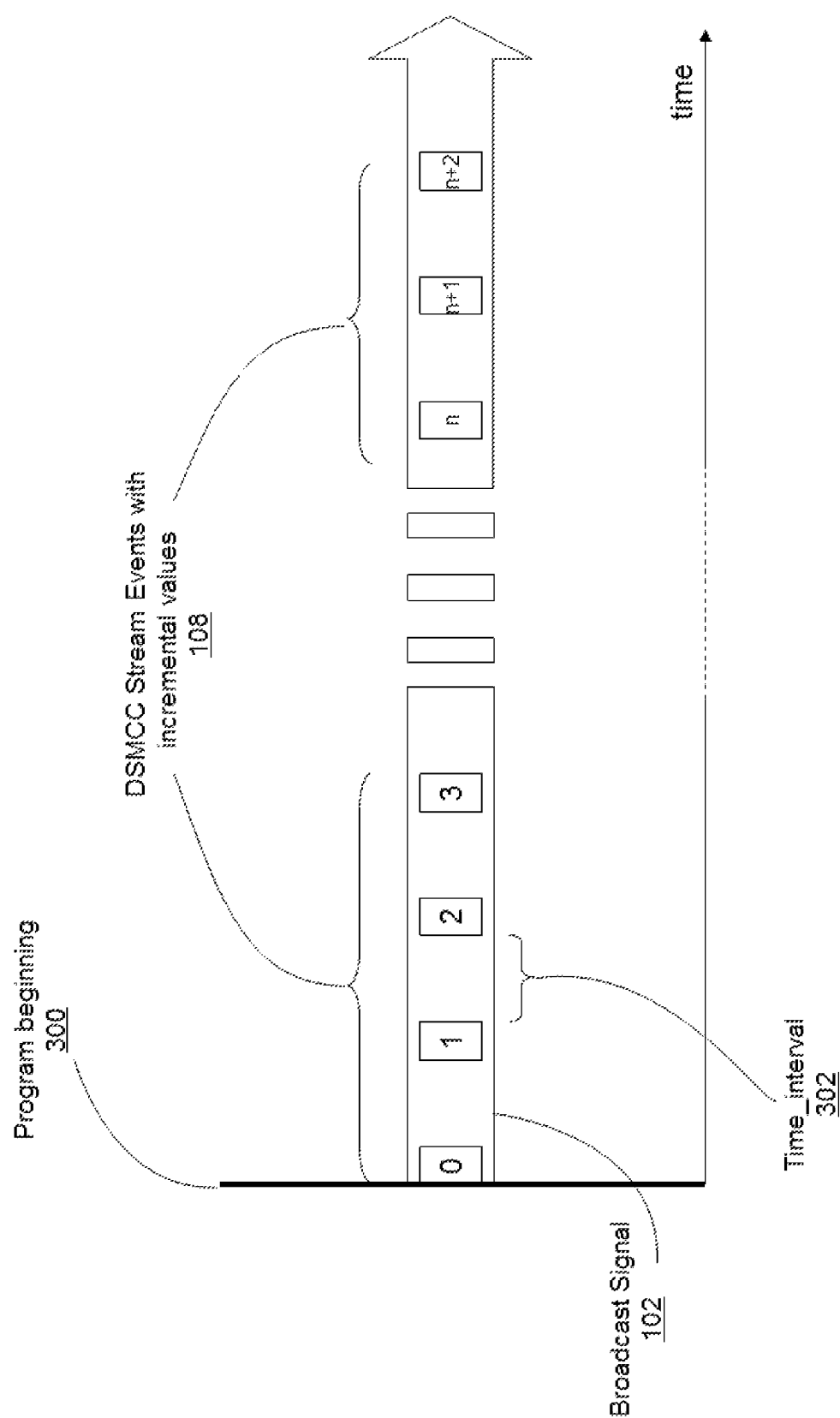
FIG. 3 is a digital TV signal generated by a broadcaster containing DSMCC stream events with incremental values according to the present invention.

Though demanding greater support from the broadcaster (refer to FIG. 3), which is expectable in an interactive application, the present invention does not produce processing overhead on the digital TV reception apparatus, since the messages are sent over a long space of time, and in turn, the application manages to continue the synchronization 216 of subtitles even in the absence of an event (which may be lost in the signal) 218, since it has its own time counter.

The method of the present invention is designed to allow data of an interactive content 124 to be synchronized with the audio 112 and video 110 of TV broadcasting even if the broadcaster's signal is temporarily lost. In such case, even after having lost various messages 218, the application is prepared to continue the synchronization 212, 214, 216. Even if it desynchronizes after a certain time, as soon as the next message arrives 212, synchronization is implemented as normal 206.

In the same way, regardless of the instant in which the digital TV reception apparatus is turned on, since the interactive content data will be synchronized with the audio and video of TV broadcasting at the moment in which the user accesses said content by activating the interactive application 104.

Example 1

Karaoke Application

In the case of providing a karaoke application, at the start of the transmission of the video of the song, before the start of the song, the initial value is sent to start marking for synchronization. In other words, at the start, the value 0 is sent and, for example, every two seconds, the next value is sent in ascending order.

In the karaoke application, all these events with the sequence value are updated, enabling a more attuned synchronicity with the song. However, after receiving an event with a value and updating its time base, the application continues counting the time for displaying the subtitles, founded on its now synchronized base. This also allows the interactive content, in the case of karaoke, to begin at any point in the song and synchronize normally.

The invention claimed is:

1. A method for synchronizing contextual interactive content with audio and/or video of television broadcasting, comprising:
   a) delivering an application for digital television in broadcast digital television signal;
   b) downloading the application on to a digital television receiver apparatus; and
   c) executing the application in a standardized execution environment for digital television in which synchronization is implemented, wherein the application is sent by a broadcaster and, when executed, the application comprises:
      i) registering as a DSM-CC events listener with event messages that define values of a counter that comprises:
         values corresponding to the synchronicity between the interactive content and the audio and/or video; and
         time interval values that instruct when the application executed will check whether the interactive content is in synchronization with the audio and/or video;
      ii) identifying a sequence value corresponding to the synchronization and a time interval value sent by the event messages transmitted via DSM-CC;
      iii) initiating timer and own counter;
      iv) synchronizing the interactive content data of the application in execution with the audio and/or video of the TV broadcasting in accordance with the value sent by the DSM-CC stream event at each pre-set time interval;
      v) maintaining an ascending count of the sequence value; and
      vi) keeping check on the synchronicity in the same time interval informed by the stream events of the protocol even in the absence of the signal, by way of the timer and counter initiated in item ii).

2. The method according to claim 1, wherein the synchronization events sent by the broadcaster are sent via the DSM-CC protocol.

3. The method according to claim 2, wherein the DSM-CC protocol is an object carousel.

4. A method for synchronizing contextual interactive content with audio and/or video of digital television broadcasting of a television program, comprising the steps of:

a) jointly delivering:
   i) an application for digital television in a broadcast digital television signal; and
   ii) contextual interactive content that is related to a current television program in the broadcast digital television signal;
b) downloading the application from the broadcast digital television signal onto a digital television receiver when the digital television receiver is tuned into the broadcaster digital television signal;
c) executing the application in a standardized execution environment for digital television present in the digital television receiver; and
d) implementing synchronization of the contextual interactive content delivered with the application in the application itself by receiving synchronization events sent by a broadcaster in the broadcaster digital television signal and by using a counter for maintaining and updating the synchronization in situations when no new DSM-CC events are being received, wherein when executed in the digital television receiver, the application:
   i) registers as a DSM-CC events listener to receive event messages that define the values of a counter that comprises:
      values corresponding to the synchronicity between the interactive content and the audio and/or video; and
      time interval values that instruct when the application executed will check whether the contextual interactive content is in synchronization with the audio and/or video;
   ii) identifies a sequence value corresponding to the synchronization and the time interval value sent by the messages transmitted via DSM-CC protocol;
   iii) initiates a timer and a counter; and
   iv) synchronizes the interactive content data of the application in execution with the audio and/or video of the digital television broadcasting of a television program in accordance with the time interval value sent in the DSM-CC events at each pre-set time interval;
   wherein the application in execution maintains the ascending count of the sequence value and keeps check on the synchronization in the same time interval informed by stream events of the DMS-CC protocol even in the absence of the broadcast digital television signal, by way of the timer and the counter initiated in step iii).

5. The method according to claim 4, further comprising delivering the application using DSM-CC object carousel protocol.

6. The method according to claim 5, wherein the digital television receiver is a television reception apparatus.

7. The method according to claim 6, wherein the standardized execution environment for digital television is selected from the group consisting of Ginga, MHP, and OCAP.

* * * * *